$\text{US}010831784\text{B}2$

(12) United States Patent
Schwing et al.

(10) Patent No.: US 10,831,784 B2
(45) Date of Patent: Nov. 10, 2020

(54) INTEGRATION OF RELATIONAL CALCULATION VIEWS INTO A RELATIONAL ENGINE

(71) Applicant: SAP SE, Walldorf (DE)

(72) Inventors: Julian Schwing, Heidelberg (DE); Johannes Merx, Heidelberg (DE); Christoph Weyerhaeuser, Leimen (DE)

(73) Assignee: SAP SE, Walldorf (DE)

( * ) Notice: Subject to any disclaimer, the term of this patent is extended or adjusted under 35 U.S.C. 154(b) by 478 days.

(21) Appl. No.: 15/150,365

(22) Filed: May 9, 2016

(65) Prior Publication Data

US 2017/0323001 A1 Nov. 9, 2017

(51) Int. Cl.
*G06F 16/28* (2019.01)
*G06F 16/23* (2019.01)
*G06F 16/242* (2019.01)

(52) U.S. Cl.
CPC ........ *G06F 16/284* (2019.01); *G06F 16/2365* (2019.01); *G06F 16/2445* (2019.01)

(58) Field of Classification Search
CPC ......... G06F 17/30339; G06F 17/30595; G06F 16/284; G06F 16/2445; G06F 16/2365
USPC ........................................................ 707/737
See application file for complete search history.

(56) References Cited

U.S. PATENT DOCUMENTS

| | | | | |
|---|---|---|---|---|
| 6,567,802 B1 * | 5/2003 | Popa | ................. | G06F 16/24542 |
| 8,234,308 B2 * | 7/2012 | Brunswig | ............ | G06Q 10/103 |
| | | | | 707/793 |
| 9,033,797 B1 * | 5/2015 | Karpiuk | .................. | A63F 13/08 |
| | | | | 463/31 |
| 2007/0226203 A1 * | 9/2007 | Adya | ................... | G06F 16/2445 |
| 2009/0327254 A1 * | 12/2009 | Bruno | ..................... | G06F 16/22 |
| 2012/0005190 A1 * | 1/2012 | Faerber | ............. | G06F 16/24524 |
| | | | | 707/718 |
| 2012/0166422 A1 * | 6/2012 | Harren | ............... | G06F 16/24542 |
| | | | | 707/718 |
| 2012/0221549 A1 * | 8/2012 | Weyerhaeuser | .. | G06F 16/24544 |
| | | | | 707/713 |

(Continued)

*Primary Examiner* — Pierre M Vital
*Assistant Examiner* — Nargis Sultana
(74) *Attorney, Agent, or Firm* — Mintz Levin Cohn Ferris Glovsky and Popeo, P.C.

(57) ABSTRACT

A calculation engine of a database management system is described. In some implementations, the calculation engine receives a calculation scenario including a plurality of calculation views comprising one or more relational operations. The calculation engine determines whether a first calculation view includes a second calculation view configured as an operand of one of the relational operations of the first calculation view, and also determines whether the second calculation view comprises a non-relational operation. The calculation engine further converts the plurality of calculation views into a calculation plan via merging the first calculation view with the second calculation view when the first calculation view is determined to comprise the second calculation view as an operand, and replacing the second calculation view with a view search operation when the second calculation view is determined to comprise the non-relational operation. Related systems, methods, and articles of manufacture are also described.

22 Claims, 7 Drawing Sheets

(56) References Cited

U.S. PATENT DOCUMENTS

| | | | |
|---|---|---|---|
| 2013/0166589 A1* | 6/2013 | Baeumges | G06F 16/2455 707/769 |
| 2013/0166892 A1* | 6/2013 | Sachs | G06F 9/00 713/1 |
| 2013/0290297 A1* | 10/2013 | Weyerhaeuser | G06F 16/9038 707/717 |
| 2014/0136552 A1* | 5/2014 | Jakobsen | G06F 16/24564 707/754 |
| 2014/0365464 A1* | 12/2014 | Weyerhaeuser | G06F 16/242 707/714 |
| 2014/0372365 A1* | 12/2014 | Weyerhaeuser | G06F 16/283 707/602 |
| 2014/0372368 A1* | 12/2014 | Schroetel | G06F 16/221 707/603 |
| 2015/0046499 A1* | 2/2015 | Choi | G06F 16/128 707/803 |
| 2015/0095973 A1* | 4/2015 | Neumueller | H04L 63/20 726/1 |
| 2015/0142777 A1* | 5/2015 | Mindnich | G06F 16/245 707/722 |
| 2015/0261822 A1* | 9/2015 | Weyerhaeuser | G06F 16/2455 707/718 |
| 2015/0363463 A1* | 12/2015 | Mindnich | G06F 16/2453 707/718 |
| 2016/0110670 A1* | 4/2016 | Chatterjee | G06T 11/206 705/7.39 |
| 2016/0117364 A1* | 4/2016 | Jahankhani | G06F 16/2438 707/760 |
| 2016/0140175 A1* | 5/2016 | Weyerhaeuser | G06F 16/24542 707/718 |
| 2016/0147642 A1* | 5/2016 | Haeuptle | G06F 11/3684 717/124 |
| 2017/0192998 A1* | 7/2017 | Sergeev | G06F 16/162 |

* cited by examiner

INTEGRATION OF RELATIONAL CALCULATION VIEWS INTO A RELATIONAL ENGINE

TECHNICAL FIELD

The subject matter described herein relates to integration of relational calculation views into a relational (e.g., SQL) engine.

BACKGROUND

Calculation scenarios can be described as acyclic graphs which represent the data flow and data manipulation process for executing a database query. These calculation scenarios can consist of different data source types and different types of operators. For example, relational operators like joins, aggregations, or unions may be present, and non-relational operations like database architecture-specific operations or script-based operations may also be present. Users of database software may utilize one or more graphical "calculation views" to design database queries. Calculation views may provide users flexibility and reusability of different semantical core functionalities specific to the user's data model. However, when calculation views are nested, query runtime may increase. As such, optimizations of calculation scenarios utilizing calculation views may be desirable.

SUMMARY

A calculation engine of a database management system is described. In some implementations, the calculation engine receives a calculation scenario. The calculation scenario includes a plurality of calculation views, the plurality of calculation views comprising one or more relational operations. The calculation engine determines whether a first calculation view includes a second calculation view configured as an operand of one of the relational operations of the first calculation view, and also determines whether the second calculation view comprises a non-relational operation. The calculation engine further converts the plurality of calculation views into a relational calculation plan via merging the first calculation view with the second calculation view, when the first calculation view is determined to include the second calculation view configured as the operand, and replacing the second calculation view with a view search operation, when the second calculation view is determined to comprise the non-relational operation.

In some implementations, the above-noted aspects may further include features described herein, including one or more of the following: Providing, from the calculation engine, the relational calculation plan to a relational database engine external to the calculation engine for execution. The merging comprises replacing the operand of the one or more relational operations of the first calculation view with a root node of the second calculation view, wherein all nodes of the second calculation view which stem from the root node remain in the merged calculation view. The view search operation comprises a relational operation which, when executed, extracts the results of the non-relational operation. The relational calculation plan comprises a plurality of relational database operations, each operating on another one of the relational database operations or data from a database. The one or more relational operations comprises a logical operation performed utilizing one or more database table structures. The non-relational operation comprises a scripted calculation view operation. The scripted calculation view operation comprises source code including at least one of imperative loop operations, if conditions, and variable assignments.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and one or more memory circuits coupled to the one or more data processors. The one or more memory circuits may temporarily or permanently store instructions that cause at least one processor to perform one or more of the operations described herein. In addition, methods can be implemented by one or more data processors either within a single computing system or distributed among two or more computing systems. Such computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

Like reference symbols in the various drawings indicate like elements.

DETAILED DESCRIPTION

Calculation scenarios utilizing calculation views can produce useful results. However, when attempting to optimize calculation views which contain non-relational operations, certain optimizations may be inhibited. For example, calculation view unfolding can require that all operations be "relational" within the plurality of calculation views that are unfolded. This can be required because the relational (e.g., SQL) engine to which the unfolded view is provided may not be capable of executing non-relational operations at runtime. Thus, the current subject matter is generally directed to processing calculation scenarios such that they may be consumed by a relational engine, regardless of whether the calculation scenario contains non-relational operations.

Figure 1:
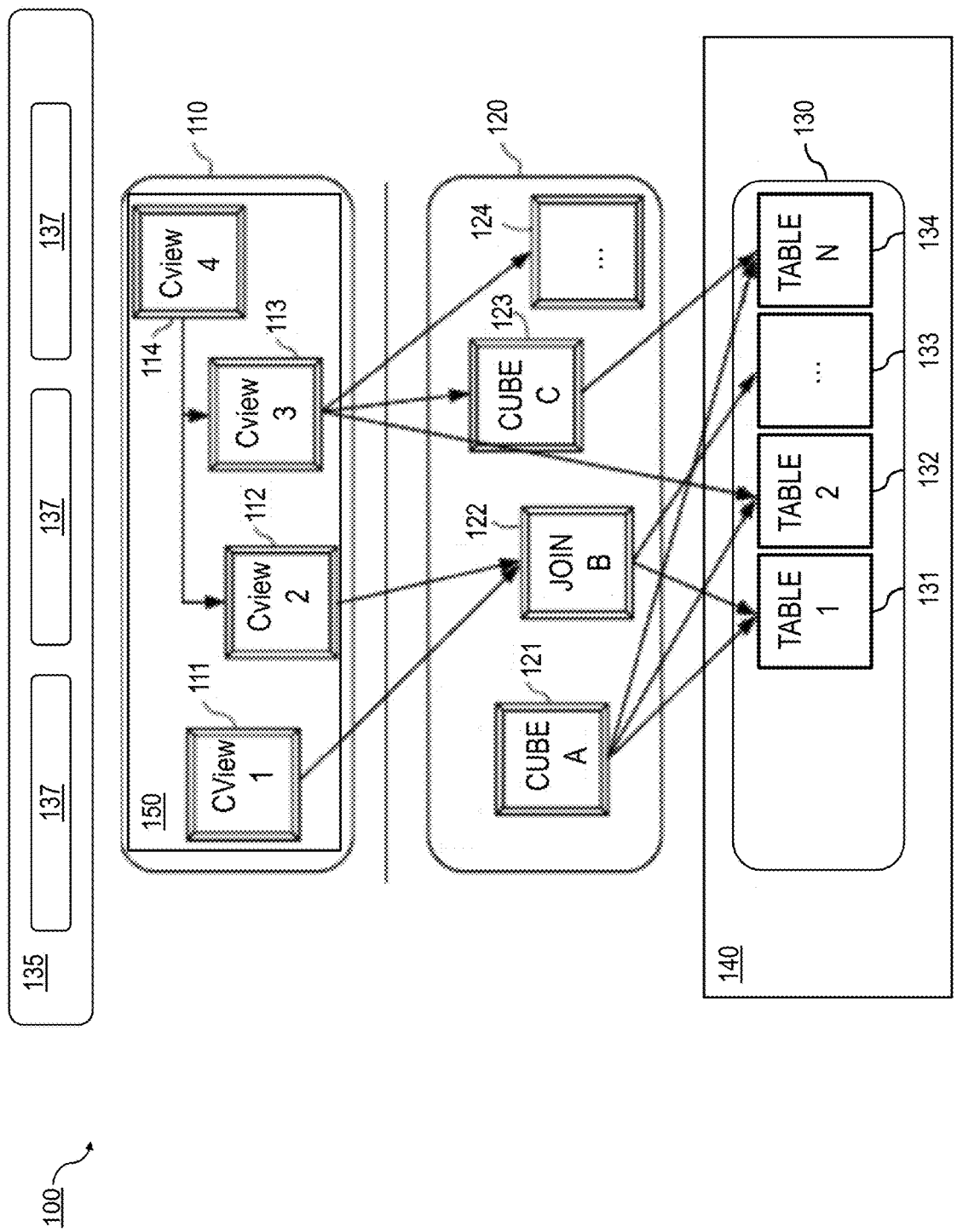
FIG. 1 is a diagram illustrating a computer architecture including a database system that includes three layers.

FIG. 1 is a diagram that illustrates a computing architecture 100 including a database system that includes three layers: a calculation engine layer 110, a logical layer 120, and a physical table-pool 130. One or more application servers 135 implementing database client applications 137 may access the database system 100. Calculation scenarios may be executed by a calculation engine, which may form part of a database or which can be part of the calculation engine layer 110 (which is associated with the database). The calculation engine layer 110 can be based on and/or interact with the other two layers, the logical layer 120 and/or the physical table pool 130. The basis of the physical table pool 130 consists of physical tables (called indexes) containing the data, which can be stored on one more database servers 140. Various tables 131-134 can be joined using logical metamodels 121-124 defined by the logical layer 120 to form an index. For example, the tables 131-134 in the illustrated $Cube_A$ metamodel 121 (e.g., an online analytical processing or "OLAP" index or other type of data structure) can be assigned roles (e.g., fact or dimension tables) and be joined to form a star schema. It is also possible to form join indexes (e.g. the $Join_B$ metamodel 122 in FIG. 1 or other type of schema), which can act like database views in computing environments, such as the Fast Search Infrastructure (FSI) available from SAP SE of Walldorf, Germany.

As stated above, a calculation scenario 150 can include individual nodes 111-114 (e.g., calculation views), which in turn each define operations such as joining various physical or logical indexes and other calculation views (e.g., the $CView_4$ node 114 is illustrated as a join of the $CView_2$ node 112 and the $CView_3$ node 113). That is, the input for a node 111-114 can be one or more of a relational operation, a non-relational operation, or another node 111-114. Relational operations generally refer to operations that may be executed by a relational (e.g., SQL) engine. For example, joins, unions, aggregations, and/or the like are considered relational operations. On the other hand, non-relational operations can be operations that are not part of the relational engine's language. For example, loops over intermediate results, scripted views/operators, procedural logic, currency conversion, multiproviders, and/or the like are considered non-relational operations.

In a calculation scenario 150, two different representations can be provided including a pure calculation scenario in which all possible attributes are given and an instantiated model (also referred to herein as "optimized calculation scenario") that contains only the attributes requested in the query (and required for further calculations). Thus, calculation scenarios can be created that can be used for various queries. With such an arrangement, a calculation scenario 150 can be created which can be reused by multiple queries even if such queries do not require every attribute specified by the calculation scenario 150. Similarly, calculation views (e.g., nodes 111-114) may be created so that they may be reused in multiple calculation scenarios 150. This reusability can provide for simplified development of database queries.

Every calculation scenario 150 and/or calculation view node 111-114 can be uniquely identifiable by a name (e.g., the calculation scenario 150 can be a database object with a unique identifier or some other indicia). Accordingly, the calculation scenario 150 can be queried in a manner similar to a view in a SQL database. Thus, the query is forwarded to the calculation node 111-114 for the calculation scenario 150 that is marked as the corresponding default node. In addition, a query can be executed on a particular calculation node 111-114 (as specified in the query). Furthermore, nested calculation scenarios can be generated in which one calculation scenario 150 is used as source in another calculation scenario (e.g. via a calculation node 111-114 in this calculation scenario 150). Each calculation node 111-114 can have one or more output tables. One output table can be consumed by several calculation nodes 111-114.

Figure 2:
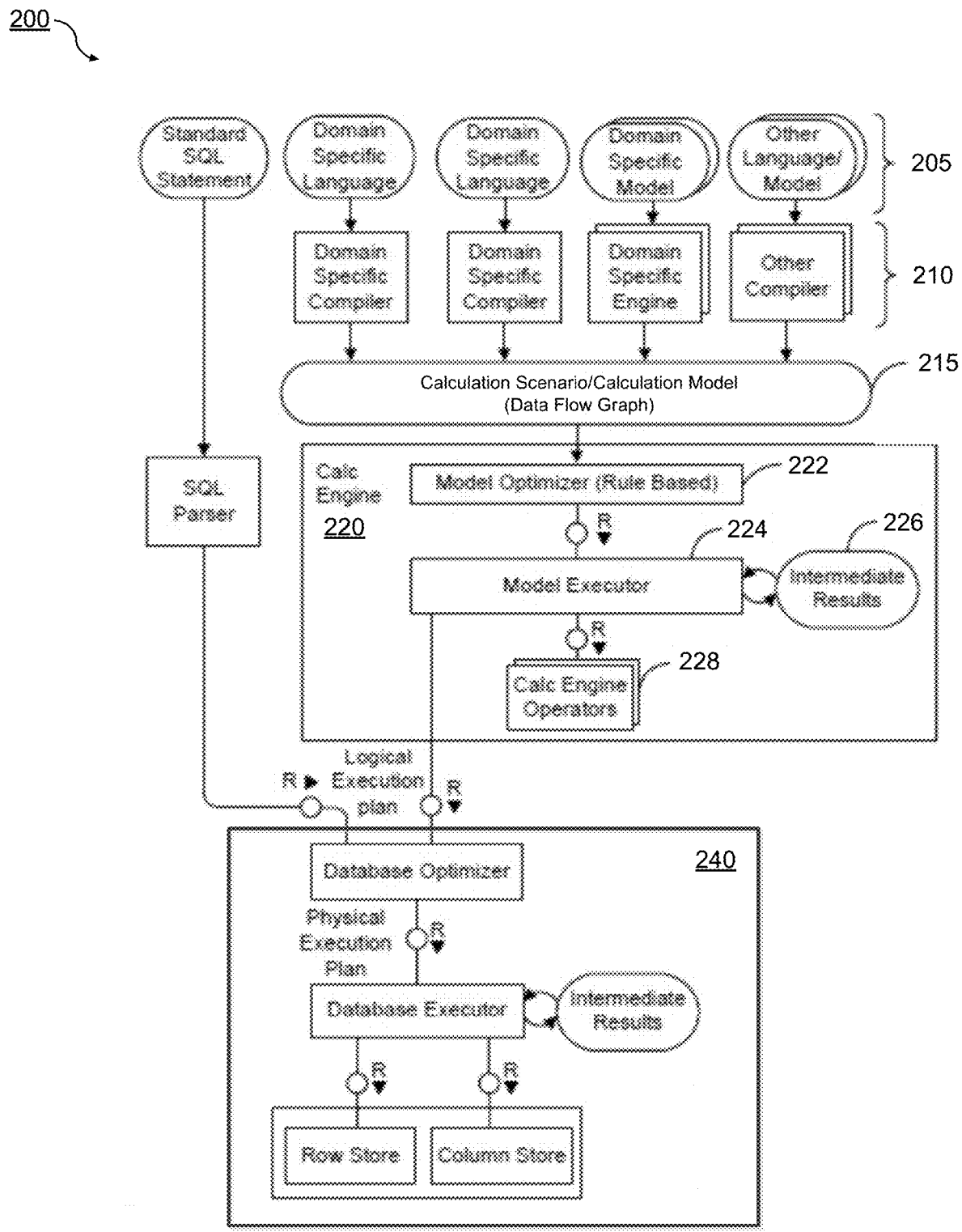
FIG. 2 is a functional block diagram illustrating a sample architecture for request processing and execution control.

FIG. 2 is a diagram illustrating a sample architecture 200 for request processing and execution control. As shown in FIG. 2, artifacts 205 in different domain specific languages can be translated by their specific compilers 210 into a common representation called a "calculation scenario" 215 (which may also referred to as a calculation model). Calculation scenario 215 may be similar to the calculation scenario 150 of FIG. 1. To achieve enhanced performance, the models and programs written in these languages can be executed inside a database server 240 (which may be similar to the database server 140 of FIG. 1). This arrangement eliminates the need to transfer large amounts of data between the database server 240 and a client application 137, which can be executed by the application server 135. Once the different artifacts 205 are compiled into this calculation scenario 215, they can be processed and executed in the same manner. A calculation engine 220 optimizes and/or executes the calculation scenarios 215. At least a portion of the illustrated architecture 200 may be implemented as a database management system (e.g., not including the artifacts 205).

A calculation scenario 215 can be represented as a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 137 at the application server 135). Inputs can be connected to tables or to the outputs of other nodes. A calculation scenario 215 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 215 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, they can use a split. Then, the nodes can be automatically multiplied between split and merge and partition the data.

A calculation scenario 215 can be defined as part of database metadata and invoked multiple times. A calculation scenario 215 can be created, for example, by a SQL statement "CREATE CALCULATION SCENARIO <NAME> USING <XML or JSON>". Once a calculation scenario 215 is created, it can be queried (e.g., "SELECT A, B, C FROM "<scenario name>", etc.). In some cases, databases can have pre-defined calculation scenarios 215 (e.g., defaults, those previously defined by users, etc.). Calculation scenarios 215 can be persisted in a repository (coupled to the database server 240) or in transient scenarios. Calculation scenarios 215 can also be kept in-memory.

Calculation scenarios 215 may be considered more powerful than traditional SQL queries or SQL views for many reasons. One reason is the possibility to define parameterized calculation schemas that are specialized when the actual query is issued. Unlike a SQL view, a calculation scenario 215 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 215 may contain an aggregation node containing all attributes. Later, the attributes for grouping can be supplied with the query. This allows having a predefined generic aggregation, with the actual aggregation dimensions supplied at invocation time. The calculation engine 220 can use the actual parameters, attribute list, grouping attributes, and the like supplied with the invocation to instantiate a query specific calculation scenario 215. This instantiated calculation scenario 215 is optimized for the actual query and does not contain attributes, nodes or data flows that are not needed for the specific invocation.

When the calculation engine 220 gets a request to execute a calculation scenario 215, it can first optimize the calculation scenario 215 using a rule based model optimizer 222. Examples for optimizations performed by the model optimizer 222 can include "push down" filters and projections so that intermediate results 226 are narrowed down earlier, or the combination of multiple aggregation and join operations into one node. The optimized model can then be executed by a calculation engine model executor 224 (a similar or the same model executor can be used by the database directly in some cases). This includes decisions about parallel execution of operations in the calculation scenario 215. The model executor 224 can invoke the required operators (using, for example, a calculation engine operators module 228) and manage intermediate results 226. Most of the operators can be executed directly in the calculation engine 220 (e.g., creating the union of several intermediate results 226). The remaining nodes of the calculation scenario 215 (not implemented in the calculation engine 220) can be transformed by the model executor 224 into a set of logical database execution plans. Multiple set operation nodes can be combined into one logical database execution plan if possible.

The attributes of the incoming datasets utilized by the rules of model optimizer 222 can additionally or alternatively be based on an estimated and/or actual amount of memory consumed by the dataset, a number of rows and/or columns in the dataset, and the number of cell values for the dataset, and the like.

A calculation scenario 215 as described herein can include a type of node referred to herein as a semantic node (or sometimes semantic root node). In some aspects, a database modeler can flag the root node (output) in a graphical calculation view to which the queries of the database applications are directed as semantic node. This arrangement allows the calculation engine 220 to easily identify those queries and to thereby provide a proper handling of the query in all cases.

The calculation scenarios 215 used by the calculation engine 220 can be exposed as a special type of database view called a graphical calculation view (also referred to herein as "calculation view"). For example, within a calculation view, in addition to being stackable on themselves, relational (e.g., SQL) views or operations may be stacked on top of non-relational views or operations (or on top of calculation scenarios 215), and vice-versa. Stacking in this manner may allow for a user to easily customize the front end of a program which utilizes calculation scenarios 215. Calculation views can be used in SQL queries, and can be combined with tables and standard views using joins, sub-queries, and/or the like. When such a query is executed, the database executor inside the SQL processor/engine (not shown) may need to invoke the calculation engine 220 to execute the calculation scenario 215 behind the calculation view. In some implementations, the calculation engine 220 and the SQL engine are calling each other: on one hand the calculation engine 220 invokes the SQL engine for executing set operations and SQL nodes and, on the other hand, the SQL engine invokes the calculation engine 220 when executing SQL queries with calculation views.

Using calculation views which are mainly based on relational (e.g., SQL) operators, and which are separated into different calculation view layers, may give the users (e.g., model designers) the flexibility and reusability of different semantical core functionalities in their data model. Calculation view layers can include a large amount of stacked calculation views within a query. To ensure good query response times the model optimizer 222 or some other calculation engine 220 module can merge these nested calculation views during query runtime. Doing so enables the model optimizer 222 to see and optimize the whole query plan during optimization phase, and not just a set of individual calculation views.

For example, in some aspects, calculation scenarios 215 including calculation views restricted to only relational operators can be fully converted to a relational database language format, such as SQL. Thus, complete integration of relational calculation scenarios 215 into the SQL layer during query compilation time is possible. This procedure of converting one or more calculation views into relational database language format may be referred to herein as calculation "view unfolding". However, in some aspects, for relational optimizations like join re-ordering and other cost based optimizer decisions, a relational optimizer may be more suitable for relational like calculation models.

Notably, the integration of calculation view queries into the SQL layer via view unfolding requires the complete calculation view to be converted to SQL, which as a consequence, requires that all merged calculation views can be converted to SQL. Thus, although calculation view unfolding is very useful in a lot of real world customer scenarios and often provides significant performance improvements, these benefits are limited due to the fact that the complete calculation view has to rely only on relational semantic for view unfolding.

Users often enrich their calculation views with non-relational operations such as script-based calculation views (also referred to herein as "scripted views") which allow users to use imperative procedure logic within calculation scenarios 215. Accordingly, these scripted views may be present within the logical calculation query plan, and may include different operations which can be separated into relational operations and non-relational operations for all imperative logic. In SQL Script imperative logic-like loops, if conditions, or variable assignments are usually compiled with another programming language (language "L") as an intermediate language which can be compiled and executed by the calculation engine 220 with specialized plan operations, and might not be executable by a SQL engine. Thus, even though SQL script is a powerful tool for users to express complex imperative logic in data models, plan operations which consist of compiled L code are a hard break in the calculation scenario 215, and have to be treated as black box operations which cannot be integrated into the SQL engine. Even though scripted views themselves may not be critical from a performance point of view, their presence within a calculation view can affect the performance of a query by blocking the plan from being fully converted and integrated into the SQL engine via view unfolding, and therefore may harm the query performance. Thus, methods and apparatuses for converting stacked calculation views into a format consumable by SQL engines regardless of whether they contain non-relational operations are described.

Figure 3:
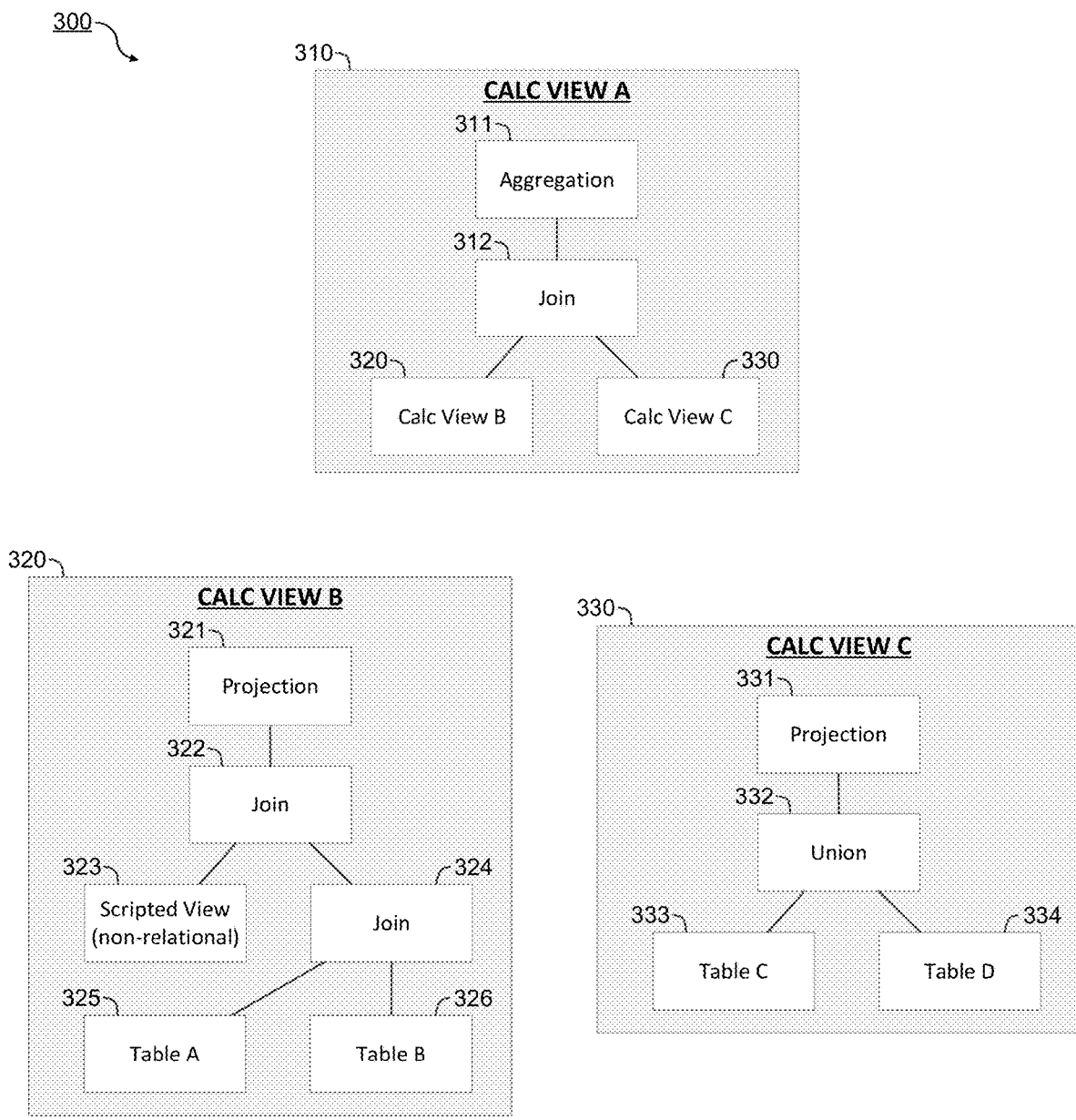
FIG. 3 is a diagram that illustrates an unoptimized calculation scenario including a plurality of calculation views.

FIG. 3 is a diagram that illustrates an unoptimized calculation scenario 300 including a plurality of calculation views 310, 320, 330 (referred to herein collectively as "calculation views 310-330"). As illustrated, each of the calculation views 310-330 contain one or more relational or non-relational operations. For example, calculation view A 310 includes an aggregation operation 311 (as the root node) performed on a join operation 312, where the join operation 312 is performed upon calculation view B 320 (left part) and calculation view C 330 (right part). As further illustrated, calculation view B 320 includes a projection operation 321 (root node) performed upon a join operation 322, where the join operation is performed upon a scripted view operation 323 (left part), and a join operation 324 (right part), and where the join operation 324 is performed upon table A 325 (left part) and table B 326 (right part). Finally, calculation view C 330 includes a projection operation 331 (root node) performed on a union operation 332, where the union operation 332 is performed upon table C 333 (left part) and table D 334 (right part).

Calculation scenario 300 may be similar to the calculation scenario 150 of FIG. 1 or the calculation scenario 215 of FIG. 2. Although three calculation views 310-330 are illustrated, more or less calculation views may be present in the calculation scenario 300. Similarly, each calculation view 310-330 may include more or less operations (e.g., relational or non-relational) which may be stacked upon each other.

Of note in this calculation scenario 300, the scripted view operation 323 is illustrated as being a non-relational operation. Instead of a scripted view operation, other non-relational operations may instead be present within the calculation scenario 300. As noted above, non-relational operations may prevent optimizations of the calculation scenario 300, reducing the performance of a query utilizing the calculation scenario 300. Thus, in order to increase query performance, the scripted view operation may be replaced with a view search operation in an instantiated model of the calculation scenario 300.

Figure 4:
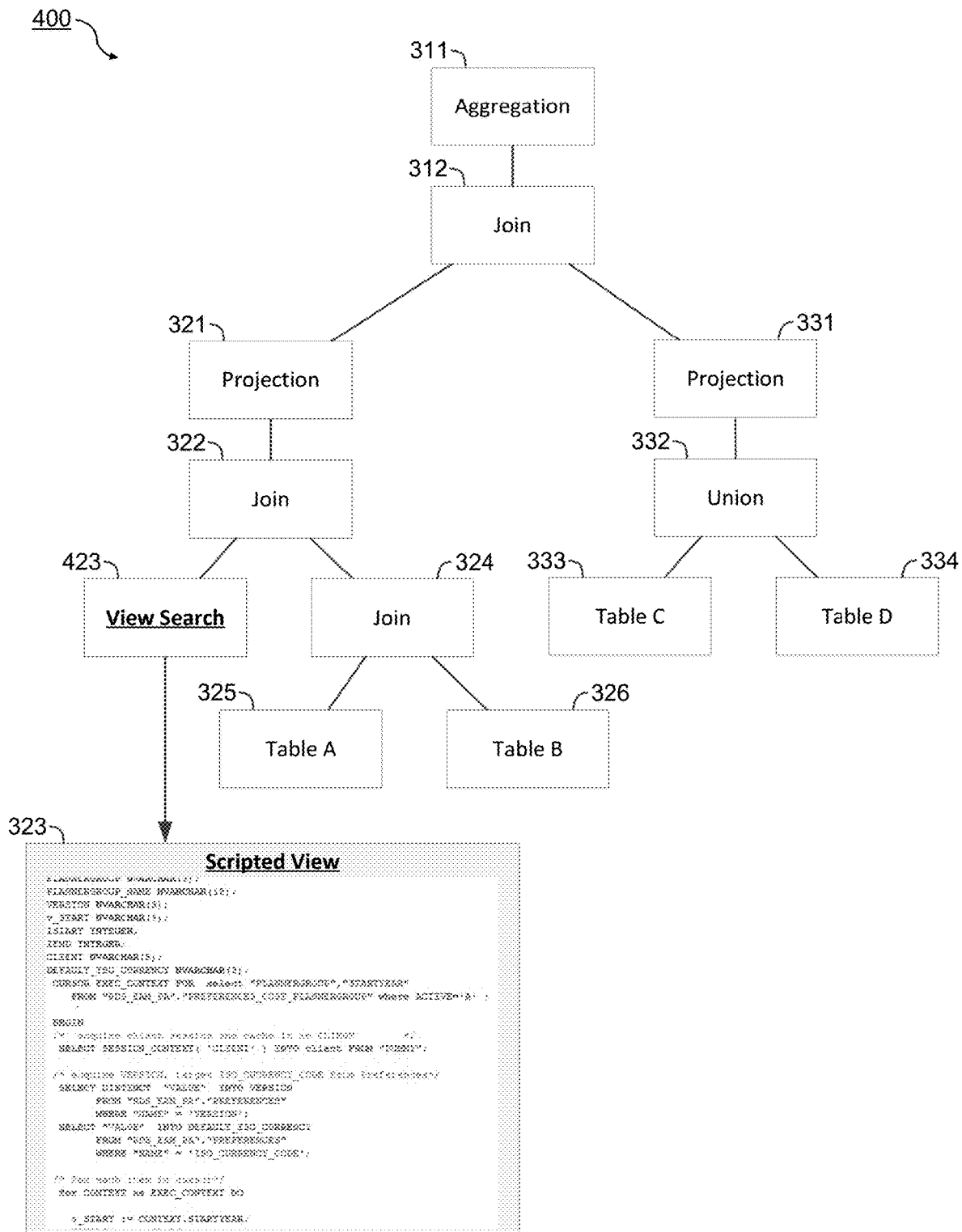
FIG. 4 is a diagram that illustrates an optimized calculation scenario based on a plurality of calculation views.

FIG. 4 is a diagram that illustrates an optimized calculation scenario 400 based on the plurality of calculation views 310-330 from FIG. 3. The optimized calculation scenario 400 includes the same operations as the calculation scenario 300, but instead replaces calls to calculation views with the actual operations contained within the calculation views. For example, rather than having calculation view 320 as the left part of join operation 312, the left part of the join operation 312 is replaced with the root node of calculation view 320 (e.g., the projection operation 321). The remaining operations present within calculation view 320 follow thereafter. Similarly, rather than having calculation view 330 as the right part of join operation 312, the right part of the join operation 312 becomes the root node of calculation view 330 (e.g., the projection operation 331). The remaining operations present within calculation view 330 follow thereafter.

This optimization process of replacing the calls to calculation views 320, 330 can be an example of calculation view unfolding. As noted above, calculation view unfolding may allow a relational (e.g., SQL) view to consume the calculation scenario in a more efficient manner, as the relational view will not need to call the calculation engine 220, for example, each time it needs to execute a call for another calculation view 310-330. However, performing calculation view unfolding upon calculation scenarios containing non-relational operations may cause problems, as the relational engine is generally not be capable of compiling or executing the non-relational operation. Accordingly, as illustrated, the scripted view 323 in the optimized calculation scenario 400 is replaced with a view search operation 423. This view search operation 423 may be a simple function which extracts the data of the scripted view 323 during execution time, and may therefore be consumable by the relational engine. Thus, optimization of the calculation scenario 300 may be provided through its "translation" into the calculation scenario 400 by the calculation engine 220 (e.g., in an instantiated model). Various embodiments for performing this translation are provided herein.

Figure 5:
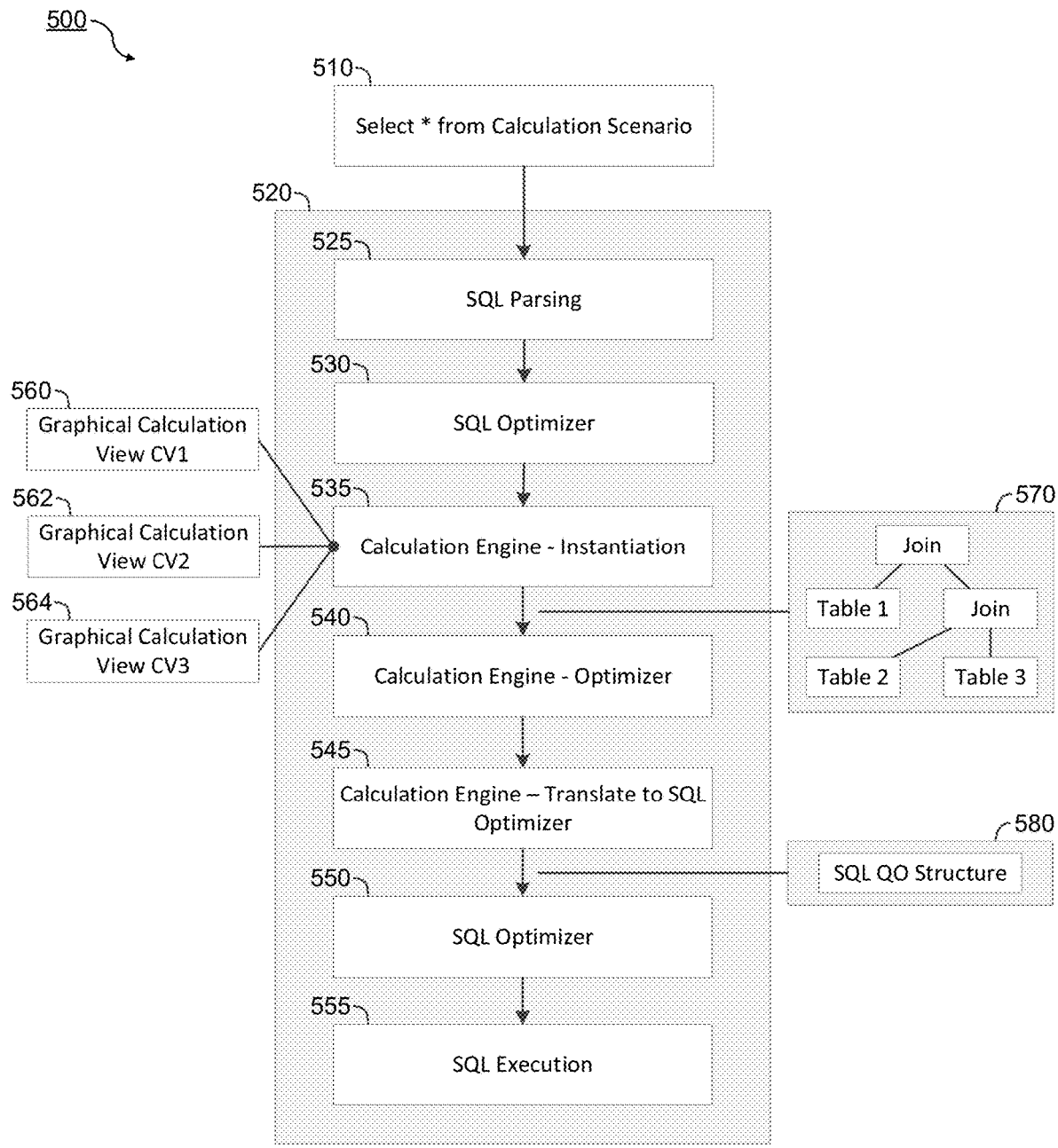
FIG. 5 is a diagram that illustrates a process for optimizing calculation scenarios containing non-relational operators.

For example, FIG. 5 is a diagram that illustrates a process 500 for optimizing calculation scenarios containing non-relational operators. In some aspects, process 500 may be referred to as a view merge process. Although illustrated as a linear sequence of operational blocks, various implementations of process 500 may not include all of the illustrated operational blocks, may include more operations, and may be executed in a different order.

As illustrated, process 500 may start as operational block 510, where an artifact 205, for example, selects a calculation scenario (e.g., from the database or provided at execution time). For example, a query may be SELECT * from "CALCVIEW" T1 inner join "REGION_TABLE" T2 on T1."region"=T2.="dimid". Next, at operational block 520, the selected calculation scenario may be optimized. As part of this optimization, the selected calculation scenario (and/or calculation views therein) may be instantiated, optimized, and integrated into a logical SQL plan. Thereafter, execution control can be passed to the SQL layer. Specifically, as illustrated, this optimization may include one or more of operational blocks 525-555.

At operational block 525, a SQL engine, for example, may parse and compile the SQL query given by a user such that it can be represented in the form of one or more logical SQL (relational) operations. One logical SQL operator can thereby be a search (sub select) on a calculation view, such as the SELECT * from CALCVIEW query, for example. Next, at operational block 530, a SQL optimizer may detect a calculation view within the logical SQL plan and ask the calculation engine 220 layer to translate/unfold the nested calculation view query into a SQL plan itself (e.g., in operational block 535-545). The sub query on a calculation view is thereby passed to the calculation engine layer and integrated as a sub plan into a global SQL plan containing the join.

At operational block 535, the calculation engine 220, for example, merges a plurality of graphical calculation views 560-564 to form an instantiated model of the calculation views 560-564. For example, the instantiated model may be similar to the calculation scenario 400 of FIG. 4. In order to form the instantiated model, for each nested calculation view (e.g., any of the calculation views 560-564 which is an operand of an operation within another one of the calculation views 560-564), the calculation engine 220 may determine whether to merge the view (sub graph plan) into the existing plan, or to stop the merge (cut off the plan) and use a view search operation for extracting the data of a view during execution time. As a view search operator itself can be fully translated into SQL, the approach of skipping a specific view merge can be used to preserve the relational semantic of the current intermediate instantiated calculation plan. This process of merging can be done in topological order by starting at the top most (root) node and proceeding to all leaf nodes until no more merges or cut-offs may be performed. In some aspects, each individual calculation view 560-564 may be heuristically checked to determine whether it includes a non-relational operation before a merge step is performed. Additionally or alternatively, the calculation engine 220 may check to determine model complexity of a view or to identify specific patterns. The resulting instantiated model may be similar to the relational calculation plan 570 shown.

Once the instantiated model is formed, at operational block 540, the calculation engine 220, for example, may optimize the instantiated model. For example, the calculation engine 220 may determine that one or more operations within the instantiated model may be pruned, or may otherwise alter the format of the calculation scenario in order to reduce query runtime.

At operational block 545, the calculation engine 220, for example, may translate the optimized calculation scenario into a language that is executable by a SQL engine. Thereafter, the calculation engine 220, for example, may provide the translated calculation scenario in a SQL query optimizer (QO) structure 580 to a SQL engine. In some aspects, the QO structure can be a relational algebra structure which can be processed by the SQL optimizer or SQL engine. At operational block 550, the SQL engine may integrate the calculation view representation into the global query plan and perform SQL optimizations/rewrite steps on the global plan. Thereafter, at operational block 555, the SQL engine, for example, may execute the calculation scenario. As part of the execution, the SQL engine may request information from the calculation engine 220, such as when the SQL engine attempts to execute a view search operation, as described herein.

Figure 6:
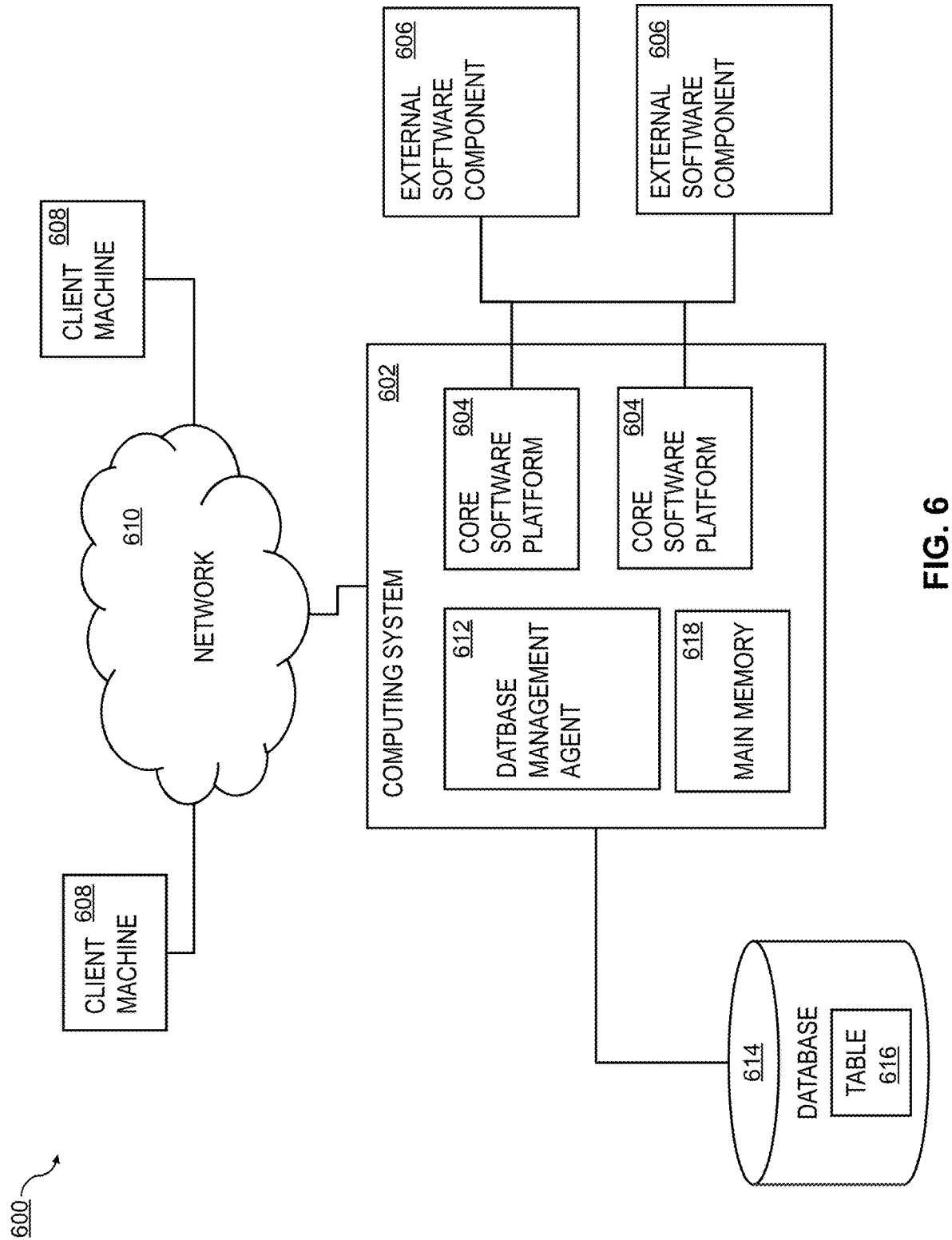
FIG. 6 is a diagram of a system that can implement one or more features consistent with the current subject matter.

FIG. 6 is a diagram of a system 600 that can implement one or more features consistent with the current subject matter. A computing system 602 can include one or more core software platform modules 604 providing one or more features of a high-level programming software system or other software that includes database management features. The computing system can also aggregate or otherwise provide a gateway via which users can access functionality provided by one or more external software components 606. One or more client machines 608 can access the computing system, either via a direct connection, a local terminal, or over a network 610 (e.g. a local area network, a wide area network, a wireless network, the Internet, or the like).

A database management agent 612 or other comparable functionality can access a database 614 that includes at least one table 616, which can in turn include at least one column. The database management agent 612 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 612 or other comparable functionality can be configured to load a database table 616, or other comparable data set, into the main memory 618. The database management agent 612 can be configured to load the information from the database 614 to the main memory 618 in response to receipt of a query instantiated by a user or computer system through one or more client machines 608, external software components 606, core software platforms 604, or the like. At least a portion of the illustrated system 600 may be implemented as a database management system (e.g., not including the client machines 608, the network 610, and/or the external software components 606). In some aspects, a database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

Figure 7:
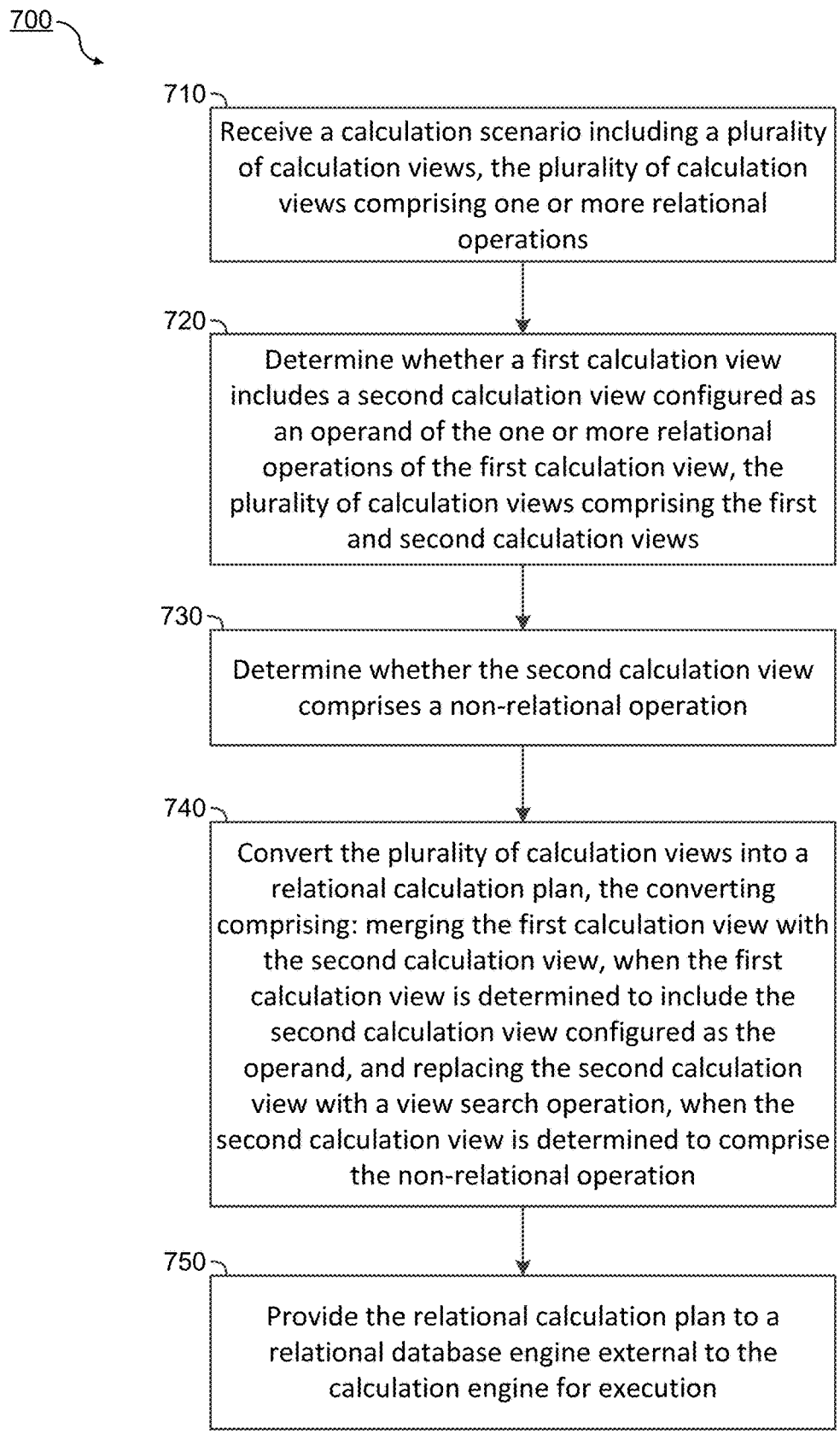
FIG. 7 is a process flow diagram illustrating an exemplary method of processing a calculation scenario for executing a query.

FIG. 7 is a process flow diagram illustrating an exemplary method 700 of processing a calculation scenario for executing a query. In various implementations, the method 700 may be performed by the calculation engine 220 of FIG. 2, the computing system 602 of FIG. 6, or other hardware and/or software components described herein, or equivalents thereof. Although illustrated in linear fashion, in various implementations, the steps of the method 700 may be executed in a different order, and not all of the steps of method 700 may be required or executed.

At operational block 710 the calculation engine 220, for example, receives a calculation scenario including a plurality of calculation views, the plurality of calculation views comprising one or more relational operations. In some aspects, the one or more relational operations comprise a logical operation performed utilizing one or more database table structures. In an implementation, the calculation scenario comprises one or more database queries, the one or more database queries including the plurality of calculation views.

At operational block 720 the calculation engine 220, for example, determines whether a first calculation view includes a second calculation view configured as an operand of the one or more relational operations of the first calculation view, the plurality of calculation views comprising the first and second calculation views. In some aspects, the operand may refer to a child node of a relational operation. For example, if a particular join (relational) operation is defined as the intersection of two nodes (e.g., data tables), then each of the two nodes would be operands of the join operation.

At operational block 730 the calculation engine 220, for example, determines whether the second calculation view comprises a non-relational operation. For example, the calculation engine 220 may determine whether the second calculation view is a scripted calculation view. In some aspects, the non-relational operation comprises a scripted calculation view operation. For example, in some implementations, the scripted calculation view operation comprises source code including at least one of imperative loop operations, if conditions, and variable assignments.

At operational block 740 the calculation engine 220, for example, converts the plurality of calculation views into a relational calculation plan. As illustrated, the converting comprises merging the first calculation view with the second calculation view, when the first calculation view is determined to include the second calculation view configured as the operand, and replacing the second calculation view with a view search operation, when the second calculation view is determined to comprise the non-relational operation. In some implementations, the relational calculation plan comprises a plurality of relational database operations, each operating on another one of the relational database operations or data from a database. In some aspects, merging comprises replacing the operand of the one or more relational operations of the first calculation view with a root node of the second calculation view, wherein all nodes of the second calculation view which stem from the root node remain in the merged calculation view. In an implementation, the view search operation comprises a relational operation which, when executed, extracts the results of the non-relational operation.

At operational block 750 the calculation engine 220, for example, provides the relational calculation plan to a relational database engine external to the calculation engine for execution. The external relational engine may comprise one or more of the compilers 210 of FIG. 2.

In some implementations, the calculation engine can comprise at least one programmable processor and at least one memory storing instructions that, when executed by the at least one programmable processor to implement the receiving, the executing, the converting, and the providing of operational blocks 710-740.

Without in any way limiting the scope, interpretation, or application of the claims appearing below, a technical effect of one or more of the example embodiments disclosed herein is more efficient execution of complex calculation scenarios while allowing a developer to develop less complex software. For example, a user may be allowed to create reusable graphical representations of database calculations/queries that use both relational and non-relational operations without restricting some of the relational optimizations that generally cannot be performed on operations written in a different programming language.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, at a calculation engine of a database management system, a query invoking a calculation scenario including a plurality of calculation views, the plurality of calculation views comprising one or more relational operations;
   determining, by the calculation engine, that a first calculation view includes a second calculation view configured as a relational operand of the one or more relational operations of the first calculation view, the plurality of calculation views comprising the first and second calculation views;
   determining, by the calculation engine, that the second calculation view comprises a non-relational operation that cannot be executed by a relational database engine;
   converting, by the calculation engine, the plurality of calculation views into a relational calculation plan that can be executed by the relational database engine, the converting comprising:
      merging the first calculation view with the second calculation view to form a merged calculation view when the first calculation view is determined to include the second calculation view configured as the relational operand and the second calculation view comprises the non-relational operation, wherein the merging includes replacing the second calculation view with a view search operation when the second calculation view is determined to comprise the non-relational operation that cannot be executed by the relational database engine, and
      identifying, subsequently to the merging, one or more patterns in one or more operations of merged calculation views to generate the relational calculation plan;
   optimizing the generated relational calculation plan, using the one or more identified patterns, by pruning one or more operations from the relational calculation plan and altering a format of the calculation plan; and
   executing, by the calculation engine, the query, the query being executed by at least providing, to the relational database engine, the optimized relational calculation plan for execution, the relational database engine executing the optimized relational calculation plan by at least executing relational operations of the merged calculation view including the view search operation that replaced the non-relational operation of the second calculation view.

2. The method of claim 1, wherein the calculation engine includes a first interface to one or more client applications and a second interface to the relational database engine.

3. The method of claim 1, wherein the merging comprises replacing the operand of the one or more relational operations of the first calculation view with a root node of the second calculation view, wherein all nodes of the second calculation view which stem from the root node remain in the merged calculation view.

4. The method of claim 1, wherein the view search operation comprises a relational operation which, when executed by the relational database engine, extracts the results of the non-relational operation.

5. The method of claim 1, wherein the relational calculation plan comprises a plurality of relational database operations, each operating on another one of the plurality of relational database operations or on data from a database.

6. The method of claim 1, wherein the one or more relational operations comprises a logical operation performed utilizing one or more database table structures.

7. The method of claim 1, wherein the non-relational operation comprises a scripted calculation view operation.

8. The method of claim 7, wherein the scripted calculation view operation comprises source code including at least one of imperative loop operations, if conditions, and variable assignments.

9. The method of claim 1, wherein the calculation scenario comprises one or more database queries, the one or more database queries including the plurality of calculation views.

10. The method of claim 1, wherein the calculation engine comprises at least one programmable processor and at least one memory storing instructions that, when executed by the at least one programmable processor, cause the at least one programmable processor to implement the receiving, the determining, the converting and the executing.

11. A non-transitory computer program product storing instructions which, when executed by at least one hardware data processors, result in operations comprising:
   receiving, at a calculation engine of a database management system, a query invoking a calculation scenario including a plurality of calculation views, the plurality of calculation views comprising one or more relational operations;
   determining, by the calculation engine, that a first calculation view includes a second calculation view configured as a relational operand of the one or more relational operations of the first calculation view, the plurality of calculation views comprising the first and second calculation views;
   determining, by the calculation engine, that the second calculation view comprises a non-relational operation that cannot be executed by a relational database engine;
   converting, by the calculation engine, the plurality of calculation views into a relational calculation plan that can be executed by the relational database engine, the converting comprising:
      merging the first calculation view with the second calculation view to form a merged calculation view when the first calculation view is determined to include the second calculation view configured as the relational operand and the second calculation view comprises the non-relational operation wherein the merging includes replacing the second calculation view with a view search operation when the second calculation view is determined to comprise the non-relational operation that cannot be executed by the relational database engine, and identifying, subsequently to the merging, one or more patterns in one or more operations of merged calculation views to generate the relational calculation plan;

optimizing the generated relational calculation plan, using the one or more identified patterns, by pruning one or more operations from the relational calculation plan and altering a format of the calculation plan; and executing, by the calculation engine, the query, the query being executed by at least providing, to the relational database engine, the optimized relational calculation plan for execution, the relational database engine executing the optimized relational calculation plan by at least executing relational operations of the merged calculation view including the view search operation that replaced the non-relational operation of the second calculation view.

12. The non-transitory computer program product of claim 11, wherein the merging comprises replacing the operand of the one or more relational operations of the first calculation view with a root node of the second calculation view, wherein all nodes of the second calculation view which stem from the root node remain in the merged calculation view.

13. The non-transitory computer program product of claim 11, wherein the view search operation comprises a relational operation which, when executed by the relational database engine, extracts the results of the non-relational operation.

14. The non-transitory computer program product of claim 11, wherein the relational calculation plan comprises a plurality of relational database operations, each operating on another one of the plurality of relational database operations or on data from a database.

15. The non-transitory computer program product of claim 11, wherein the one or more relational operations comprises a logical operation performed utilizing one or more database table structures.

16. A system comprising:
at least one hardware data processor; and
at least one memory storing instructions which, when executed by the at least one data processor, result in operations comprising:
receiving, at a calculation engine of a database management system, a query invoking a calculation scenario including a plurality of calculation views, the plurality of calculation views comprising one or more relational operations;

determining, by the calculation engine, that a first calculation view includes a second calculation view configured as a relational operand of the one or more relational operations of the first calculation view, the plurality of calculation views comprising the first and second calculation views;

determining, by the calculation engine, that the second calculation view comprises a non-relational operation that cannot be executed by a relational database engine;

converting, by the calculation engine, the plurality of calculation views into a relational calculation plan that can be executed by the relational database engine, the converting comprising:
merging the first calculation view with the second calculation view to form a merged calculation view when the first calculation view is determined to include the second calculation view configured as the relational operand and the second calculation view comprises the non-relational operation, wherein the merging includes replacing the second calculation view with a view search operation when the second calculation view is determined to comprise the non-relational operation that cannot be executed by the relational database engine, and identifying, subsequently to the merging, one or more patterns in one or more operations of merged calculation views to generate the relational calculation plan;

optimizing the generated relational calculation plan, using the one or more identified patterns, by pruning one or more operations from the relational calculation plan and altering a format of the calculation plan; and executing, by the calculation engine, the query, the query being executed by at least providing, to the relational database engine, the optimized relational calculation plan for execution, the relational database engine executing the optimized relational calculation plan by at least executing relational operations of the merged calculation view including the view search operation that replaced the non-relational operation of the second calculation view.

17. The system of claim 16, wherein the merging comprises replacing the operand of the one or more relational operations of the first calculation view with a root node of the second calculation view, wherein all nodes of the second calculation view which stem from the root node remain in the merged calculation view.

18. The system of claim 16, wherein the view search operation comprises a relational operation which, when executed by the relational database engine, extracts the results of the non-relational operation.

19. The system of claim 16, wherein the relational calculation plan comprises a plurality of relational database operations, each operating on another one of the plurality of relational database operations or on data from a database.

20. The system of claim 16, wherein the one or more relational operations comprises a logical operation performed utilizing one or more database table structures.

21. The method of claim 1, wherein converting, by the calculation engine, further comprises performing optimizations including one or more of providing push down filters or projections, or combining multiple aggregation and join operations into one node.

22. The method of claim 1, wherein the second calculation view comprises a scripted view operation and the view search operation extracts data of the scripted view operation during execution and thus is consumable by the relational database engine.

* * * * *